United States Patent
Yan

(10) Patent No.: US 9,749,719 B2
(45) Date of Patent: Aug. 29, 2017

(54) COMMUNICATION CONVERTING APPARATUS AND METHOD FOR PULSE METER, AND COMMUNICATION SYSTEM FOR AIR CONDITIONER

(71) Applicants: GD MIDEA HEATING & VENTILATING EQUIPMENT CO., LTD., Foshan (CN); MIDEA GROUP CO., LTD., Foshan (CN)

(72) Inventor: Jie Yan, Foshan (CN)

(73) Assignee: GD Midea Heating & Ventilating Equipment Co., Ltd., Foshan (CN)

( * ) Notice: Subject to any disclaimer, the term of this patent is extended or adjusted under 35 U.S.C. 154(b) by 178 days.

(21) Appl. No.: 14/848,015

(22) Filed: Sep. 8, 2015

(65) Prior Publication Data

US 2016/0295306 A1    Oct. 6, 2016

(30) Foreign Application Priority Data

Mar. 30, 2015  (CN) .......................... 2015 1 0143911

(51) Int. Cl.
*H04Q 9/14* (2006.01)
(52) U.S. Cl.
CPC ........... *H04Q 9/14* (2013.01); *H04Q 2209/60* (2013.01)

(58) Field of Classification Search
CPC ............................. H04Q 2209/60; H04Q 9/14
USPC ........................................................ 340/870.02
See application file for complete search history.

(56) References Cited

U.S. PATENT DOCUMENTS

| | | | | |
|---|---|---|---|---|
| 4,302,750 A | * | 11/1981 | Wadhwani | H02J 13/0079 340/12.32 |
| 2002/0029770 A1 | * | 3/2002 | Heffel | F02B 43/00 123/527 |
| 2002/0035441 A1 | * | 3/2002 | Ruesch | G01F 1/08 702/100 |
| 2016/0302735 A1 | * | 10/2016 | Noguchi | A61B 5/6898 |

\* cited by examiner

*Primary Examiner* — Omer S Khan
(74) *Attorney, Agent, or Firm* — Lathrop & Gage LLP

(57) ABSTRACT

A communication converting apparatus for a pulse meter is provided, comprising: a pulse collection unit, configured to collect a pulse signal generated from the pulse meter; a storage unit, configured to store a reading of the pulse meter; a micro control unit, configured to control the pulse collection unit to collect the pulse signal, to read the reading stored in the storage unit, and to obtain an updated reading of the pulse meter according to the pulse signal and the reading stored in the storage unit; and a RS485 communication unit, configured to covert the updated reading of the pulse meter into a RS485 communication signal for outputting.

6 Claims, 3 Drawing Sheets

COMMUNICATION CONVERTING APPARATUS AND METHOD FOR PULSE METER, AND COMMUNICATION SYSTEM FOR AIR CONDITIONER

CROSS-REFERENCE TO RELATED APPLICATION

This application claims priority to and benefits of Chinese Patent Application Serial No. 201510143911.4, filed with the State Intellectual Property Office of P. R. China on Mar. 30, 2015, the entire content of which is incorporated herein by reference.

FIELD

The present disclosure relates to a communication technology for an electric meter, and more particularly to a communication converting apparatus for a pulse meter, a communication converting method and a communication system for an air conditioner.

BACKGROUND

The pulse meter is a type of electric energy meter which is widely used, particularly in North America. Compared with the conversional 86 series electric meter, the pulse meter is improved by adding an electric pulse device, while maintaining the same installation size. However, the pulse output lead of the pulse meter, which uses a dedicated terminal junction box, may identify a power direction, output a forward direction pulse and a reverse direction pulse respectively, and output an active pulse and a passive pulse according to the use's requirement.

However, the communication distance of the pulse meter is relatively short, which is generally 200 meters, and thus it is difficult to meet the communication requirement between the electric meter and the consumer device. By using RS485, the communication distance of the pulse meter may reach about 1200 meters, thus significantly increasing the communication distance of the electric meter.

In order to increase the communication distance of the electric meter, the pulse communication may be converted into RS485 communication by PLC (Programmable Logic Controller) in the prior art. However, because the PLC is relatively expensive, the conventional way to convert the pulse communication into RS485 communication by PLC is high in cost, and thus it is difficult to popularize.

SUMMARY

Embodiments of the present disclosure seek to solve at least one of the problems existing in the related art to at least some extent.

According to a first aspect of the present disclosure, a communication converting apparatus for a pulse meter is provided. The apparatus comprises: a pulse collection unit, configured to collect a pulse signal generated from the pulse meter; a storage unit, configured to store a reading of the pulse meter; a micro control unit, configured to control the pulse collection unit to collect the pulse signal, to read the reading stored in the storage unit, and to obtain an updated reading of the pulse meter according to the pulse signal and the reading stored in the storage unit; and an RS485 communication unit, configured to convert the updated reading of the pulse meter into an RS485 communication signal for outputting.

With the communication converting apparatus for the pulse meter according to embodiments of the present disclosure, an RS485 communication between the pulse meter and a consumer device is realized, and a cost of the RS485 communication is effectively reduced.

In some embodiments, the pulse collection unit may be provided with photoelectric isolation.

In some embodiments, the micro control unit may comprise: an interrupt port, configured to receive the pulse signal from the pulse collection unit; a timer, configured to acquire a width of the received pulse signal; and a determining unit, configured to determine whether the width of the pulse signal reaches a predetermined pulse width, and to update the reading of the pulse meter in response to the width of the pulse signal reaching the predetermined pulses width.

In some embodiments, the apparatus may further comprise a voltage detection unit configured to detect a voltage drop in the pulse meter, and the micro control unit may be further configured to store the updated reading of the pulse meter in the storage unit when the voltage detection unit detects that a voltage drop occurs in the pulse meter.

In some embodiments, the apparatus may further comprise a power supply configured to supply power to the micro control unit, the pulse collection unit, the RS485 communication unit and the storage unit.

According to a second aspect of the present disclosure, a communication converting method is provided. The method comprises: reading an original reading of a pulse meter; collecting a pulse signal generated from the pulse meter in real-time; updating the original reading of the pulse meter according to the pulse signal so as to obtain an updated reading; and converting the updated reading into an RS485 communication signal for outputting.

With the communication converting method according to embodiments of the present disclosure, an RS485 communication between the pulse meter and the consumer device is realized, and a cost of the RS485 communication is effectively reduced.

In some embodiments, the method may further comprise: storing the updated reading in response to a voltage drop in the pulse meter.

In some embodiments, updating the original reading of the pulse meter according to the pulse signal comprises: determining whether a width of the collected pulse signal satisfies a predetermined pulse width; if yes, updating the reading of the pulse meter; and if no, discarding the pulse signal.

In some embodiments, the updated reading of the pulse meter is obtained according to a formula of $$W_N = W_P + Q$$

where $W_N$ is the updated reading, $W_P$ is the original reading, and $Q$ is a pulse weight.

In some embodiments, converting the updated reading into an RS485 communication signal for outputting comprises: converting the updated reading into an RS485 communication signal in response to a checking request from a consumer device, and outputting the RS485 communication signal to the consumer device.

According to a third aspect of the present disclosure, a communication system for an air conditioner is provided. The system comprises: a pulse meter; an outdoor machine of an air conditioner; and a communication converting apparatus, in which the pulse meter performs an RS485 communication with the outdoor machine of the air conditioner via the communication converting apparatus, and the communication converting apparatus comprises: a pulse collection unit, configured to collect a pulse signal generated from the pulse meter; a storage unit, configured to store a reading of the pulse meter; a micro control unit, configured to control the pulse collection unit to collect the pulse signal, to read the reading stored in the storage unit, and to obtain an updated reading of the pulse meter according to the pulse signal and the reading stored in the storage unit; and an RS485 communication unit, configured to convert the updated reading of the pulse meter into an RS485 communication signal and to output the RS485 communication signal to the outdoor machine of the air conditioner.

With the communication system for the air conditioner according to embodiments of the present disclosure, an RS485 communication between the pulse meter and the outdoor of the air conditioner is realized, and a cost of the RS485 communication is effectively reduced.

In some embodiments, the pulse collection unit may be provided unit with photoelectric isolation.

In some embodiments, the micro control unit comprises: an interrupt port, configured to receive the pulse signal from the pulse collection unit; a timer, configured to acquire a width of the received pulse signal; and a determining unit, configured to determine whether the width of the pulse signal reaches a predetermined pulse width, and to update the reading of the pulse meter in response to the width of the pulse signal reaching the predetermined pulse width.

In some embodiments, the communication converting apparatus may further comprise a voltage detection unit configured to detect a voltage drop in the pulse meter, and the micro control unit may be further configured to store the updated reading of the pulse meter in the storage unit when the voltage detection unit detects that a voltage drop occurs in the pulse meter.

In some embodiments, the communication converting apparatus may further comprise a power supply configured to supply power to the micro control unit, the pulse collection unit, the RS485 communication unit and the storage unit.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
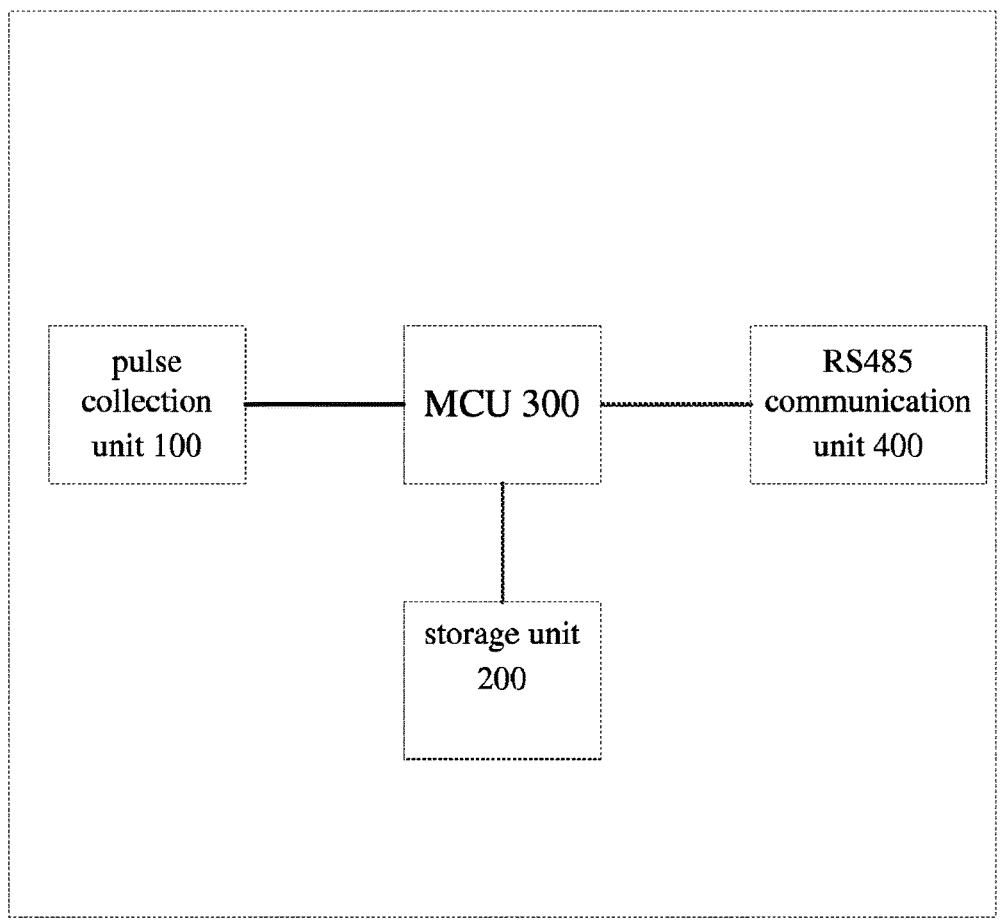
FIG. 1 is a block diagram of a communication converting apparatus for a pulse meter according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

FIG. 1 is a block diagram of a communication converting apparatus for a pulse meter according to an embodiment of the present disclosure. As shown in FIG. 1, the apparatus comprises: a pulse collection unit 100, a storage unit 200, a micro control unit (MCU) 300, and an RS485 communication unit 400.

The pulse collection unit 100 is configured to collect a pulse signal generated from the pulse meter. The storage unit 200 is configured to store a reading of the pulse meter.

The MCU 300 is connected with the pulse collection unit 100 and the storage unit 400 respectively. The MCU 300 is configured to control the pulse collection unit 100 to collect the pulse signal, to read the reading stored in the storage unit 200, and to obtain an updated reading of the pulse meter according to the pulse signal and the reading stored in the storage unit 200.

The RS485 communication unit 400 is configured to convert the updated reading of the pulse meter into a RS485 communication signal for outputting.

In one embodiment, the pulse collection unit 100 may be a pulse collection unit with photoelectric isolation, which may better protect a safety of a whole circuit.

In one embodiment, the MCU 300 may comprise an interrupt port, a timer and a determining unit (not shown). The interrupt port is configured to receive the pulse signal from the pulse collection unit 100. The timer is configured to acquire a width of the received pulse signal. The determining unit is configured to determine whether the width of the received pulse signal reaches a predetermined pulse width, and to update the reading of the pulse meter in response to the width of the pulse signal reaching the predetermined pulse width. For example, if the width of the received pulse signal satisfies the predetermined pulse width, the reading of the pulse meter is updated; if the width of the received pulse signal does not satisfy (is less than) the predetermined pulse width, the pulse signal is discarded and it is turned to determine the next pulse signal. In some embodiments, the predetermined pulse width generally ranges from 40 ms to 400 ms.

Figure 2:
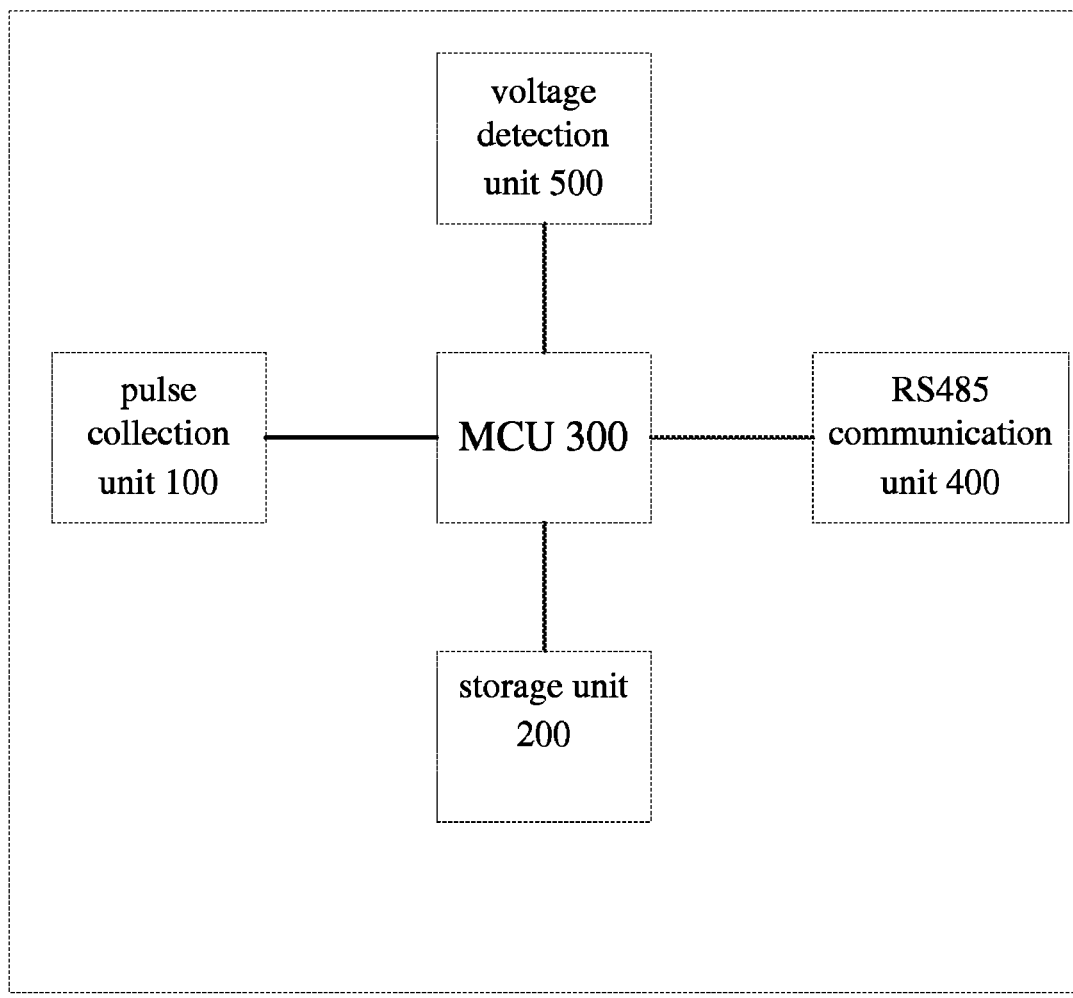
FIG. 2 is a block diagram of a communication converting apparatus for a pulse meter according to another embodiment of the present disclosure.

FIG. 2 is a block diagram of a communication converting apparatus for a pulse meter according to another embodiment of the present disclosure.

As shown in FIG. 2, based on the embodiment shown in FIG. 1, the apparatus may further comprise a voltage detection unit 500. The voltage detection unit 500 is configured to detect a voltage drop in the pulse meter. When the voltage detection unit 500 detects that a voltage drop occurs in the pulse meter, the MCU 300 stores the updated reading of the pulse meter in the storage unit 200, such that the reading stored in the storage unit 200 is updated.

The apparatus may also further comprise a power supply (not shown). The power supply is configured to supply power to the MCU 300, the pulse collection unit 100, the RS485 communication unit 400 and the storage unit 200. For example, the power supply may be connected with the MCU 300 and may supply power to the pulse collection unit 100, the RS485 communication unit 400 and the storage unit 200 via the MCU 300. Alternatively, the power supply may be connected with and supply power to the MCU 300, the pulse collection unit 100, the RS485 communication unit 400 and the storage unit 200, respectively.

Figure 3:
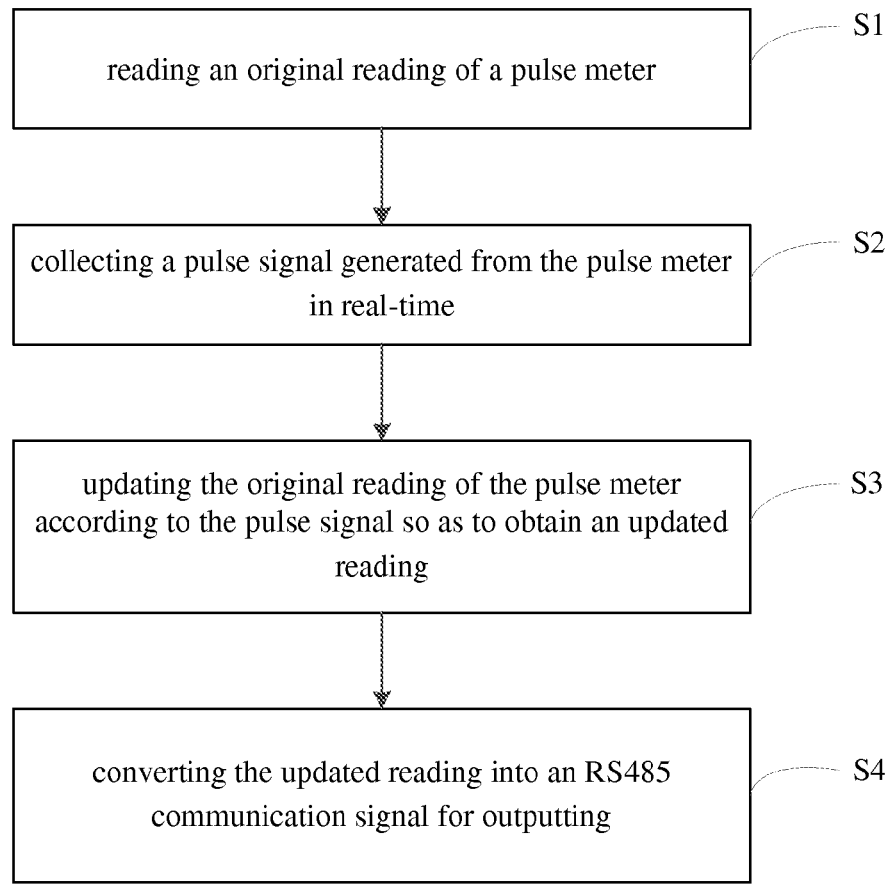
FIG. 3 is a flow chart of a communication converting method according to an embodiment of the present disclosure.

FIG. 3 is a flow chart of a communication converting method according to an embodiment of the present disclosure. As shown in FIG. 3, the method comprises following steps.

At step S1, an original reading of a pulse meter is read when there is a current flowing through a communication converting apparatus.

The communication converting apparatus may be as described above, and the original reading of the pulse meter is the reading currently stored in the apparatus.

At step S2, a pulse signal generated from the pulse meter is collected in real-time.

At step S3, the original reading of the pulse meter is updated according to the pulse signal so as to obtain an updated reading.

At step S4, the updated reading is converted into an RS485 communication signal for outputting.

In one embodiment, the method may further comprise: storing the updated reading when it is detected that a voltage drop occurs in the pulse meter.

In one embodiment, step S3 further comprises: determining whether a width of the collected pulse signal satisfies a predetermined pulse width; if yes, updating the reading of the pulse meter and turning to determine a next pulse signal; and if no, discarding the collected pulse signal and turning to determine a next pulse signal.

In one embodiment, the original reading of the pulse meter is updated by following formula:

$$W_N = W_P + Q$$

where $W_N$ is the original reading of the pulse meter, $W_P$ is the updated reading of the pulse meter and Q is a pulse weight. The pulse weight Q is an adjustable value. In this embodiment, the pulse weight Q may be set as 1 KWH/pulse.

In one embodiment, converting the updated reading into an RS485 communication signal for outputting comprises: converting the updated reading into an RS485 communication signal according to a checking request from a consumer device, and outputting the RS485 communication signal to the consumer device.

Figure 4:
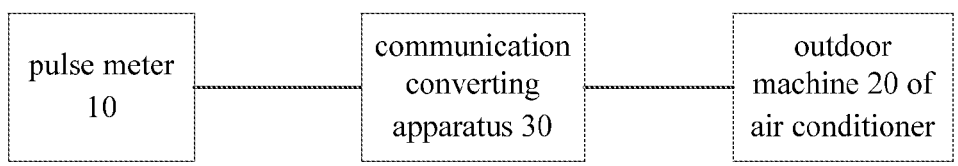
FIG. 4 is a block diagram of a communication system for an air conditioner according to an embodiment of the present disclosure.

FIG. 4 is a block diagram of a communication system for an air conditioner according to an embodiment of the present disclosure. The communication system for an air conditioner comprises: the pulse meter 10, an outdoor machine 20 of the air condition, and the communication converting apparatus 30 described above.

As shown in FIG. 4, an RS485 communication is conducted between the pulse meter 10 and the outdoor machine 20 of the air conditioner via the communication converting apparatus 30. Specifically, the communication converting apparatus 30 comprises: a pulse collection unit, configured to collect a pulse signal generated from the pulse meter 10; a storage unit, configured to store a reading of the pulse meter 10; a micro control unit, configured to control the pulse collection unit to collect the pulse signal, to read the reading stored in the storage unit, and to obtain an updated reading of the pulse meter 10 according to the reading stored in the storage unit and the pulse signal; and an RS485 communication unit, configured to convert the updated reading of the pulse meter 10 into an RS485 communication signal and output the RS485 communication signal to the outdoor machine 20 of the air conditioner.

In one embodiment, the pulse collection unit is a pulse collection unit with photoelectric isolation, which may better protect a safety of a whole circuit.

In one embodiment, the micro control unit comprises: an interrupt port, configured to receive the pulse signal from the pulse collection unit; a timer, configured to acquire a width of the received pulse signal; and a determining unit, configured to determine whether the width of the pulse signal reaches a predetermined pulse width, and to update the reading of the pulse meter in response to the width of the pulse signal reaching the predetermined pulse width.

In one embodiment, the communication converting apparatus further comprises a voltage detection unit configured to detect a voltage drop in the pulse meter 10, and the micro control unit is further configured to store the updated reading of the pulse meter in the storage unit when the voltage detection unit detects that a voltage drop occurs in the pulse meter 10.

In one embodiment, the communication converting apparatus further comprises a power supply configured to supply power to the micro control unit, the pulse collection unit, the RS485 communication unit and the storage unit.

With the communication converting apparatus and method according to embodiments of the present disclosure, an RS485 communication between the pulse meter and the consumer device is realized, and a cost of the RS485 communication is effectively reduced.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A communication converting apparatus for a pulse meter, comprising:
   a pulse collection unit, configured to collect a pulse signal generated from the pulse meter;
   a storage unit, configured to store a reading of the pulse meter;
   a micro control unit, configured to control the pulse collection unit to collect the pulse signal, to read the reading stored in the storage unit, and to obtain an updated reading of the pulse meter according to the pulse signal and the reading stored in the storage unit; and
   an RS485 communication unit, configured to convert the updated reading of the pulse meter into an RS485 communication signal for outputting;
   wherein, the pulse collection unit is provided with photoelectric isolation;
   wherein, the micro control unit comprises:
      an interrupt port, configured to receive the pulse signal from the pulse collection unit;
      a timer, configured to acquire a width of the pulse signal; and
      a determining unit, configured to determine whether the width of the pulse signal reaches a predetermined pulse width, and to update the reading of the pulse meter in response to the width of the pulse signal reaching the predetermined pulse width; and
   the apparatus further comprising a voltage detection unit configured to detect a voltage drop in the pulse meter, wherein the micro control unit is further configured to store the updated reading of the pulse meter in the storage unit when the voltage detection unit detects that a voltage drop occurs in the pulse meter.

2. The apparatus according to claim 1, further comprising a power supply configured to supply power to the micro control unit, the pulse collection unit, the RS485 communication unit and the storage unit.

3. A communication converting method, comprising:
   reading an original reading of a pulse meter;
   collecting a pulse signal generated from the pulse meter in real-time;
   updating the original reading of the pulse meter according to the pulse signal so as to obtain an updated reading;
   storing the updated reading in response to a voltage drop in the pulse meter; and
   converting the updated reading into an RS485 communication signal for outputting;
   wherein, updating the original reading of the pulse meter according to the pulse signal comprises:
      determining whether a width of the pulse signal satisfies a predetermined pulse width;
      if yes, updating the reading of the pulse meter; and
      if no, discarding the pulse signal;
   wherein converting the updated reading into an RS485 communication signal for outputting comprises:
      converting the updated reading into an RS485 communication signal in response to a checking request from a consumer device, and outputting the RS485 communication signal to the consumer device.

4. The method according to claim 3, wherein the updated reading of the pulse meter is obtained according to a formula of $$W_N = W_P + Q$$

where $W_N$ is the updated reading, $W_P$ is the original reading, and Q is a pulse weight.

5. A communication system for an air conditioner, comprising:
   a pulse meter;
   an outdoor machine of an air conditioner; and
   a communication converting apparatus, wherein the pulse meter performs an RS485 communication with the outdoor machine of the air conditioner via the communication converting apparatus, and
   the communication converting apparatus comprises:
      a pulse collection unit, configured to collect a pulse signal generated from the pulse meter;
      a storage unit, configured to store a reading of the pulse meter;
      a micro control unit, configured to control the pulse collection unit to collect the pulse signal, to read the reading stored in the storage unit, and to obtain an updated reading of the pulse meter according to the pulse signal and the reading stored in the storage unit; and
      an RS485 communication unit, configured to convert the updated reading of the pulse meter into an RS485 communication signal and to output the RS485 communication signal to the outdoor machine of the air conditioner;
   wherein, the pulse collection unit is provided with photoelectric isolation;
   the micro control unit comprises:
      an interrupt port, configured to receive the pulse signal from the pulse collection unit;
      a timer, configured to acquire a width of the received pulse signal; and
      a determining unit, configured to determine whether the width of the pulse signal reaches a predetermined pulse width, and to update the reading of the pulse meter in response to the width of the pulse signal reaching the predetermined pulse width; and
   the communication converting apparatus further comprises a voltage detection unit configured to detect a voltage drop in the pulse meter, and the micro control unit is further configured to store the updated reading of the pulse meter in the storage unit when the voltage detection unit detects that a voltage drop occurs in the pulse meter.

6. The system according to claim 5, wherein the communication converting apparatus further comprises a power supply configured to supply power to the micro control unit, the pulse collection unit, the RS485 communication unit and the storage unit.